United States Patent [19]

Hosoi et al.

[11] 4,107,128

[45] Aug. 15, 1978

[54] CARBON FIBER COMPOSITION

[75] Inventors: Keizo Hosoi; Tadayoshi Endo; Hidetosi Kanzaki, all of Fuji, Japan

[73] Assignee: Asahi Kasei Kogyo Kabushiki Kaisha, Osaka, Japan

[21] Appl. No.: 657,598

[22] Filed: Feb. 12, 1976

[30] Foreign Application Priority Data

Feb. 20, 1975 [JP] Japan .................................. 50-20379
Nov. 8, 1975 [JP] Japan ................................ 50-134331
Dec. 19, 1975 [JP] Japan ................................ 50-150651
Jan. 14, 1976 [JP] Japan .................................... 51-2747

[51] Int. Cl.$^2$ ........................... C08K 7/06; C08K 9/04
[52] U.S. Cl. ............................... 260/40 R; 260/42.17; 260/42.28; 260/830 TW; 428/367
[58] Field of Search .......... 260/42.17, 42.28, 830 TW; 428/367, 40 R

[56] References Cited

U.S. PATENT DOCUMENTS 3,652,476 3/1972 Fellers et al. ................. 260/830 TW
3,845,010 10/1974 Labana et al. .................... 260/42.28
3,957,716 5/1976 Weldy .......................... 260/830 TW Primary Examiner—James H. Derrington
Attorney, Agent, or Firm—Armstrong, Nikaido, Marmelstein & Kubovcik

[57] ABSTRACT

A carbon fiber composition containing carbon fiber, at least one vinyl addition polymer having at least one oxirane ring and, occasionally, one or more polyfunctional epoxy compounds is provided. This carbon fiber composition facilitates the handling of carbon fibers and improves the physical properties of carbon fiber composite materials.

4 Claims, No Drawings

CARBON FIBER COMPOSITION

The present invention relates to a carbon fiber composition, and more particularly, relates to a carbon fiber composition which facilitates the handling of carbon fibers and improves the physical properties of carbon fiber composite materials.

The term "carbon fiber" is used in a broad sense in this specification and is intended to indicate carbon fiber, graphite fiber, graphite whisker and the like.

Recently, carbon fibers have been used as a reinforcing material for composite materials both because their price has recently decreased and because of their characteristics such as light weight, high strength, high modulus and the like. However, as carbon fibers are low in elongation and are fragile, single filament of the carbon fibers are easily broken by mechanical friction and thus so-called fluffs are formed in the fibers. Such fluffs are formed during a cloth weaving process, a prepreg production process, a filament winding process and the like, and cause decreases of the composite properties as well as a remarkable decrease of the workability.

Heretofore, in order to facilitate the handling of carbon fibers, carbon fibers have been surface-finished by agents containing, as a main component, a bisphenol A-diglycidyl ether type epoxy resin. However, these agents cannot afford a sufficient filament integrity to carbon fibers to be treated and, consequently, there are problems, of forming fluffs in the fibers and decreasing the workability during a cloth weaving process, a prepreg production process, a filament winding process and the like.

Further, carbon fibers naturally have a low affinity to any matrix resins. For this reason, when they are incorporated into a composite material, serious disadvantages result. That is, for example, a sufficient interlaminar shear strength cannot be obtained, whereas a high tensile strength is exhibited due to the characteristics of the carbon fibers. In order to improve the affinity between a carbon fiber and a matrix resin and to improve the interlaminar shear strength of a composite material containing a carbon fiber and a matrix resin, the surface of carbon fibers have heretofore been oxidized in gas phase or liquid phase to thereby introduce functional groups such as, for example, a carboxyl group, phenolic hydroxyl group and the like, onto the surface of the carbon fibers. However, this surface oxidation treatment naturally has the limitation that it should be carried out without impairing the tensile strength of the carbon fibers itself and without causing a substantial loss in weight. Thus, by applying this surface oxidation treatment to carbon fibers, the adhesion property between the fiber and the matrix resin is improved, and the interlaminar shear strength of the composite material increases. However this improvement is still far less than the level which is required in the practical use. Accordingly, there is a strong need to improve the interlaminar shear strength of the composite material by improving the surface properties of carbon fibers, especially in the field of application for a carbon fiber reinforced composite material in which high reliability is required.

Consequently, conventional surface treatment of carbon fibers consists essentially of applying gas phase or liquid phase surface oxidation treatment to carbon fibers and then surface-finishing them with a composition containing bisphenol A-diglycidyl ether type epoxy resin as a main component. However, this conventional surface treatment of carbon fibers cannot afford a sufficient improvement in the handling of carbon fibers and a high interlaminar shear strength when the composite material is made of carbon fibers. It is believed that said epoxy resin is used as a main component in the conventional surface-finishing agent for the reason that, since epoxy resin is generally employed as a matrix resin in the production of a carbon fiber reinforced composite material, a surface-finishing compound having a similar chemical structure to the matrix resin may be preferable from the point of view that an affinity problem does not occur between the surface-finishing agent layer and a matrix resin layer, and the decrease of the interlaminar shear strength due to the surface-finishing can be minimized.

The objects of the present invention are, therefore, to obviate the problems of the aforementioned conventional carbon fiber and to provide a novel carbon fiber composition which is capable of improving the handling of carbon fibers and the filament integrity of carbon fibers and increasing the interlaminar shear strength of the composite material containing carbon fibers and matrix resins.

Other objects and advantages of the present invention will be apparent from the following description.

In accordance with the present invention, there is provided a carbon fiber composition comprising carbon fiber and at least one vinyl addition polymer having at least one oxirane ring.

The other carbon fiber composition according to the present invention further contains at least one polyfunctional epoxy compound selected from the group consisting of epoxy compounds having an epoxy equivalent 80-175 and their condensation products. Said polyfunctional epoxy compounds include (a) polyfunctional epoxy compounds having the formula (I)

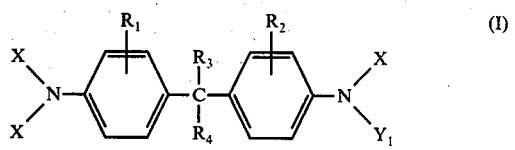

(wherein X represents

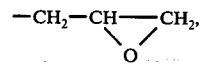

$Y_1$ represents —H or

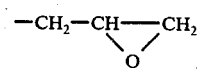

and $R_1$, $R_2$, $R_3$ and $R_4$ represent —H or —$CH_3$) and their condensation products, (b) polyfunctional epoxy compounds having the formula (II)

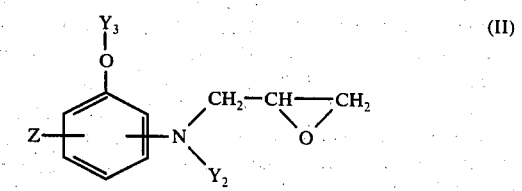

(wherein $Y_2$ and $Y_3$ represent —H or

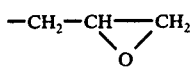

and Z represents —H, —OH,

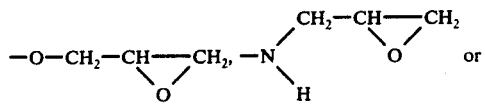

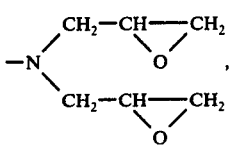

and at least three

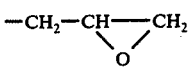

groups are contained in the compound) and their condensation products, (c) polyfunctional epoxy compounds having the formula (III)

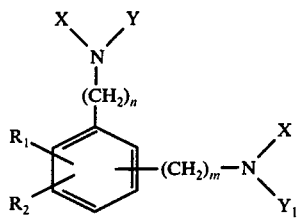     (III)

(wherein X, $Y_1$, $R_1$ and $R_2$ are the same as defined above, and n and m represent 0 or 1) and their condensation products, (d) cycloaliphatic polyfunctional epoxy compounds having the formula (IV)

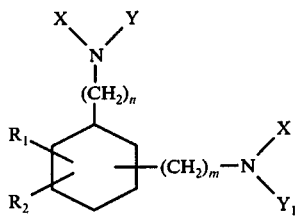     (IV)

(wherein X, $Y_1$, $R_1$, $R_2$, n and m are the same as defined above) and their condensation products and (e) novolak type epoxy resins and their condensation products.

The vinyl addition polymers having at least one oxirane ring, employed in the present invention include those which are prepared by polymerizing one or more ethylenic unsaturated compounds containing at least one oxirane ring or by copolymerizing said one or more ethylenic unsaturated compounds with one or more other polymerizable compounds, said ethylenic unsaturated compounds being, for example, glycidyl acrylate, glycidyl methacrylate, allylglycidyl ether, α-ethylglycidyl acrylate, crotonylglycidyl ether, glycidyl crotonate, glycidyl isocrotonate, monoalkyl monoglycidyl itaconate, diglycidyl itaconate, monoalkyl monoglycidyl fumarate, diglycidyl fumarate, monoalkyl monoglycidyl maleate, diglycidyl maleate and the like.

The other polymerizable compounds which are copolymerized with one or more said ethylenic unsaturated compounds having at least one oxirane ring include, for example, alkyl methacrylates such as methyl methacrylate, ethyl methacrylate, butyl methacrylate, 2-ethylhexyl methacrylate, lauryl methacrylate and the like; alkyl acrylates such as methyl acrylate, ethyl acrylate, butyl acrylate, 2-ethylhexyl acrylate, lauryl acrylate and the like; styrene or its derivatives such as α-methyl styrene, vinyl toluene and the like; vinyl esters of fatty acid such as vinyl acetate, vinyl propionate and the like; unsaturated hydrocarbons such as butadiene, isoprene and the like; halogenated unsaturated hydrocarbons such as vinyl chloride, chloroprene and the like; unsaturated nitrile compounds such as acrylonitrile, methacrylonitrile and the like; unsaturated fatty acids or their derivatives such as acrylic acid, methacrylic acid, itaconic acid, crotonic acid, maleic acid, fumaric acid, vinylacetic acid, α-ethylacrylic acid, angelic acid, (monomethyl ester, monoethyl ester and monobutyl ester) of itaconic, maleic or fumaric acid, maleic anhydride, itaconic anhydride and the like; ethylenic unsaturated compounds such as 2-hydroxyethyl methacrylate, 3-hydroxypropyl methacrylate, 2-chloro-3-hydroxypropyl methacrylate, mono(hydroxypropyl methacrylate)phosphate, acrylamide, methacrylamide, N-methylol acrylamide, N-methoxymethyl acrylamide, N-butoxymethyl acrylamide and the like.

The vinyl addition polymers having at least one oxirane ring employed in the present invention can be prepared by polymerizing or copolymerizing one or more said ethylenic compounds having at least one oxirane ring, or by copolymerizing one or more said ethylenic compounds having at least one oxirane ring with one or more said other polymerizable compounds by using the conventional solution polymerization, emulsion polymerization or suspension polymerization technique. In the solution polymerization organic solvents such as, for example, ketone, ester, alcohol, ether, aromatic hydrocarbon and the like can be used as a polymerization solvent. In the heterogeneous polymerization water or mixtures of water and water soluble organic solvents can be used as a dispersion medium. The polymerization initiator used in such polymerization is not limited to a special compound but may be selected from any known polymerization initiators such as, for example, peroxides, azo compounds and so on. If desired, chain transfer agents such as mercaptans or the like can be used in the polymerization.

The vinyl addition polymers having at least one oxirane ring employed in the present invention also include those which are prepared by introducing at least one oxirane ring, as a side-chain segment, into any vinyl addition polymers, by using a graft polymerization technique or other suitable techniques. These polymers may be used alone or in combination. Further, these polymers may also be used in combination with the above-mentioned vinyl addition polymer prepared by polymerizing or copolymerizing the ethylenic unsaturated compounds having one or more oxirane rings. In the case where the vinyl addition polymer having at least one oxirane ring is prepared by introducing at least one oxirane ring, as a side-chain segment, into any vinyl addition polymers in a graft polymerization, the graft polymerization can be performed in a similar manner to that mentioned above in the polymerization or copolymerization of the ethylenic unsaturated compounds.

The polyfunctional epoxy compounds having the formula (I) employed in the present invention include, for example, N,N,N',N'-tetraglycidyl-bis(aminophenyl)methane, N,N,N'-triglycidyl-bis(aminophenyl)methane, N,N,N',N'-tetraglycidyl-bis(aminophenyl)ethane, N,N,N-triglycidyl-bis(aminophenyl)ethane, N,N,N',N'-tetraglycidyl-bis(aminophenyl)propane, N,N,N'-triglycidyl-bis(aminophenyl)propane, N,N,N',N'-tetraglycidyl-bis(aminotoluyl)methane, N,N,N'-triglycidyl-bis(aminotoluyl)methane and the like. These polyfunctional epoxy compounds (I) can be prepared by reacting the corresponding amines with epichlorohydrin in the presence of alkaline compound in the conventional manner. Further, the condensation products of the epoxy compounds (I) can also be used as a component of the present carbon fiber composition. In this case the precondensation products having a relatively low molecular weight can be preferably used.

The polyfunctional epoxy compounds having the formula (II), employed in the present invention include, for example, N,N,O-triglycidyl aminophenol, N,N,O-triglycidyl aminoresorcinol, N,O,O'-triglycidyl aminoresorcinol, N,N,O,O'-tetraglycidyl aminoresorcinol, N,N',O-triglycidyl diaminophenol, N,N,N',O-tetraglycidyl diaminophenol, N,N,N',N',O-pentaglycidyl diaminophenol, N,N,N'-triglycidyl diaminophenol, N,N,N',N'-tetraglycidyl diaminophenol and the like. These polyfunctional epoxy compounds (II) can be prepared by reacting the corresponding aminophenol or aminoresorcinol with epichlorohydrin in the presence of alkali catalyst in the conventional manner. Further, the condensation products of the epoxy compounds (II) can be also used as a component of the present carbon fiber composition. In this case the precondensation products having a relatively low molecular weight can be preferably used.

The polyfunctional epoxy compounds having the formula (III), employed in the present invention include, for example, N,N,N',N'-tetraglycidyl phenylene diamine, N,N,N'-triglycidyl phenylene diamine, N,N,N',N'-tetraglycidyl diaminotoluene, N,N,N'-triglycidyl diaminotoluene, N,N,N',N'-tetraglycidyl diaminoxylene, N,N,N'-triglycidyl diaminoxylene, (N',N'-diglycidyltoluidyl)diglycidyl amine, (N',N'-glycidyltoluidyl)diglycidyl amine, (N',N'-diglycidyltoluidyl)glycidyl amine, N,N,N',N'-tetraglycidyl xylylenediamine, N,N,N'-triglycidyl xylylenediamine and the like. The condensation products of these compounds can be also used in the present invention. In this case the precondensation products having a relatively low molecular weight can be preferably used.

The cycloaliphatic polyfunctional epoxy compounds having the formula (IV), employed in the present invention include, for example, N,N,N'N'-tetraglycidyl diaminocyclohexane, N,N,N'-triglycidyl diaminocyclohexane, N,N,N',N'-tetraglycidyl diamino(methyl)cyclohexane, N,N,N'-triglycidyl diamino(methyl)cyclohexane, N,N,N',N'-tetraglycidyl diamino(dimethyl)cyclohexane, N,N,N'-triglycidyl diamino(dimethyl)cyclohexane, N,N-diglycidylamino(N',N'-diglycidylaminomethyl)cyclohexane, N-glycidylamino(N',N'-diglycidylaminomethyl)cyclohexane, N,N-diglycidylamino(N'-glycidylaminomethyl)cyclohexane, N,N-diglycidylaminomethyl(N',N',diglycidylaminomethyl)cyclohexane, N,N-diglycidylaminomethyl(N'-glycidylaminomethyl)cyclohexane and the like. Further, the condensation products of the these compounds can be also used as a component the present carbon fiber composition. In this case the precondensation products having a relatively low molecular weight can be preferably used.

The novolak type epoxy resins employed in the present invention are those having the formula (V)

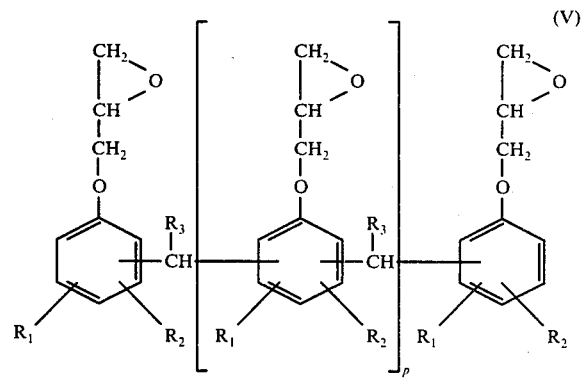

(wherein $R_1$, $R_2$ and $R_3$ are the same as defined above, and $p$ represents an integer of 1-8). These novolak type epoxy resins include, for example, epoxy-novolak which can be prepared from the reaction of novolak type phenol resin and epichlorohydrin, polyglycidyl ethers of cresolformaldehyde novolak and the like. In addition, the intermediate products which have the unreacted hydroxylgroup(s) instead of

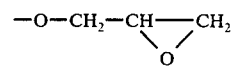

in the formula (V), can be also used in the present invention. Further, the condensation products of the novolak type epoxy resins can be also used as a component of the present carbon fiber composition. In this case the precondensation products having a relatively low molecular weight can be preferably used.

According to one aspect of the present carbon fiber composition, there is provided a carbon fiber composition comprising 90–99.9% by weight, preferably 95–99.8% by weight, of carbon fiber and 0.1–10% by weight, preferably 0.2–5% by weight, of the vinyl addition polymer having at least one oxirane ring. When the content of the vinyl addition polymer is less than 0.1% by weight, the handling properties of the carbon fiber and the physical properties of the composite material containing the carbon fiber composition are not improved. When said content is more than 10% by weight, the feel of the fiber becomes remarkably worse and the handling properties of the carbon fiber and the physical properties of the composite material containing the carbon fiber composition decrease.

In this composition, a portion of the vinyl addition polymer having at least one oxirane ring can be replaced by said polyfunctional epoxy compound(s) (the compounds (I) through (V) and their condensation products) and/or polyglycidyl ethers of aliphatic polyols and their condensation products. The polyglycidyl ethers of aliphatic polyols include, for example, triglycidyl, tetraglycidyl, pentaglycidyl and hexaglycidyl ethers of propane triol (e.g. glycerin), butane triol, pentane triol, hexane triol, erythritol, threitol, pentane tetrol (e.g. pentaerythritol), hexane tetrol, adnitol, arabitol, xylitol, allodulcitol, talitol, sorbitol, mannitol, galactitol and methyl or ethyl substituted compounds thereof. These polyglycidyl ethers can be prepared from the corresponding polyols and epichlorohydrin by the conventional manner. Further, the condensation products of the polyglycidyl ethers can be also used as a component of the present carbon fiber composition. In this case the preconsation products having a relatively low molecular weight can be preferably used. The compounding ratio (by weight) of the vinyl addition polymer to the polyfunctional epoxy compound(s) and/or the polyglycidyl ethers is 2:98–98:2, and preferably is 5:95–80:20 in view of the effect upon the handling properties of carbon fibers and the physical properties of carbon fiber composite materials. The polyfunctional epoxy compounds and the polyglycidyl ethers further improve the physical properties of the carbon fiber composite materials and also afford a suitable flexibility to the carbon fiber when they are used in combination with said vinyl addition polymer.

These compositions can be prepared by compounding or impregnating carbon fiber with a compounding agent containing said vinyl addition polymer or said vinyl addition polymer and said polyfunctional epoxy compound(s) and/or said polyglycidyl ether(s) in any conventional manner. The compounding agent is generally in the form of a solution or a dispersion, and can occasionally contain an auxiliary component such as, for example, a diluent, a lubricant, a softening agent, a film-forming additive or any mixtures thereof.

The diluent occasionally incorporated into the compounding agent includes, for example, n-butyl glycidylether, phenyl glycidylether and the like.

The lubricant occasionally incorporated into the compounding agent includes stearic acid, esters of stearic acid, nonionic and/or anionic surface active agents, silicone compounds and the like. However, it should be noted that the silicone compounds, when they are incorporated into the compounding agent in much larger quantities, decrease the affinity between the carbon fiber and the matrix resin during the formation of the composite material.

The softening agent occasionally incorporated into the compounding agent includes nonionic and/or anionic surface active agents, polyethylene glycol, esters of polyethylene glycol and the like. The film-forming additives occasionally incorporated into the compounding agent include a plasticizer such as dibutyl phthalate and dioctyl phthalate; various organic solvents having a high boiling point, water and the like.

The auxiliary components can be preferably present in the compounding agent in an amount of 50% by weight or less, more preferably 40% by weight or less, based on the total weight of the active ingredients in the compounding agent.

The solvent which can be used as a solvent for the compounding agent includes ketones, esters, ethers, alcohols, hydrocarbons and the like. The solvent employed in the compounding agent is selected from the above-mentioned solvents in accordance with the composition and the chemical structure of the components of the compounding agent. When the compounding agent is in the form of a dispersion, any conventional dispersing agents can be incorporated into the compounding agent unless they have a harmful effect on the properties of the carbon fibers.

The compounding of the carbon fiber using the compounding agent is preferably realized by first impregnating the carbon fiber with the compounding agent in the form of a solution in organic solvents or water, or a dispersion such as an emulsion, and then drying the impregnated carbon fiber to thereby vaporize the solvent or dispersing medium. The content of the active ingredient or active ingredients in the compounding agent is preferably 25% by weight or less, specifically preferably within the range from 0.5 to 5% by weight, based on the total weight of the compounding solution or dispersion.

In the case where carbon fibers are compounded with the compounding agent, the coverage of the active ingredients on the carbon fibers is preferably with the range from 0.2 to 6% by weight, based on the total weight of the carbon fiber composition. In addition, it is preferable to control the concentration of the active ingredients in the compounding agent, the impregnation time or speed, the tension of the carbon fibers during the impregnation and the temperature of the compounding bath, so as to uniformly coat the surface of the carbon fibers with the compounding agents. The carbon fiber composition is dried by means of an infrared lamp, heated air or the like and the volatile component is removed. The temperature and the time for drying are selected in accordance with the solvent or dispersing medium to be used in the compounding agent.

When the carbon fibers are compounded by using the compounding agent, they can be compounded, for example, in such a multi-step process that they are first compounded with a first agent containing said polyfunctional epoxy compound(s) and/or said polyglycidyl ether(s) in a manner as mentioned above and, then, are compounded with a second agent containing said vinyl addition polymer having one or more oxirane rings.

The carbon fiber to which the present compounding agent can be applied includes carbon or graphite fiber or graphite whisker as well as mats, fabrics, braids and the like comprising, as a main component, said fiber or whisker, and preferably includes said fiber or whisker subjected to the surface active treatment.

The vinyl addition polymer having at least one oxirane ring, used in this aspect of the present invention, has preferably a glass transition temperature of about $-10°$ through about 60° C, a solubility parameter of about 8.8 $(cal/cm^3)^{\frac{1}{2}}$ or more, a content of the monomer unit containing the oxirane ring of about 5 mole % or more and an inherent viscosity, in, for example, methylethyl ketone at 25° C, of 0.04 dl/g or more, in order to obtain an outstanding compounding effect for carbon fibers. However, these values by no means limit the scope of the present invention because the present vinyl addition polymers having values outside of the range set forth above can afford a sufficient compounding effect.

The inherent viscosity of the present vinyl addition polymer is closely correlated with both the film-forming property of the compounding agent and the toughness of the film formed. The glass transition temperature of the present vinyl addition polymer is closely correlated with flexibility of the film, and the solubility parameter of the present vinyl addition polymer is closely correlated with intermolecular cohesive energies (i.e., toughness of the film) and affinity to the carbon fibers. Further, the content of the monomer unit containing at least one oxirane ring and the bonding form of the oxirane ring in the polymer are closely correlated with the number of chemical bonds to be formed in each interface between the fiber and the compounding agent layer and the matrix resin, and also with the elasticity of the interface layer. Therefore, the design of the molecular construction of the present vinyl addition polymer should be made according to the purpose of the compounding.

According to another aspect of the present carbon fiber composition, there is provided a carbon fiber composition comprising 15–85% by weight, preferably 40–80% by weight, of carbon fiber and 15–85% by weight, preferably 20–60% by weight, of the vinyl addition polymer having at least one oxirane ring. When the content of the carbon fiber is more than 85% by weight, a carbon fiber composite material having a substantially uniform structure cannot be obtained. When said content is less than 15% by weight, the carbon fiber composite material having good physical properties cannot be obtained. In this composition, a portion of the vinyl addition polymer having at least one oxirane ring can be replaced by the polyfunctional epoxy compound(s) (the compounds (I) through (V) and their condensation products). The ratio (by weight) of the vinyl addition polymer to the polyfunctional epoxy compound(s) is 2:98–98:2, preferably, 5:95–80:20. The polyfunctional epoxy compounds further improve the physical properties of the carbon fiber composite material when they are used in combination with the vinyl addition polymer having at least one oxirane ring.

Further, in this composition, a portion of the vinyl addition polymer or the polyfunctional epoxy compound can be replaced with one or more other kinds of epoxy resins and/or other resins. The other kind of epoxy resin occasionally incorporated into the composition includes, for example, bisphenol A diglycidylether type epoxy resin, bisphenol F diglycidylether type epoxy resin, glycerine glycidylether type epoxy resin, polyglycol diglycidylether type epoxy resin, cycloaliphatic type epoxy resin, halogenated bisphenol A diglycidylether type epoxy resin and the like. The other resin occasionally incorporated into the composition includes, for example, unsaturated polyester resin, diallyl phthalate, resin, polyimide resin, polyamide imide resin, the prepolymers thereof and the like. One or more of these resins can be compounded into the composition alone or in combination with the other kinds of epoxy resin(s). These epoxy resins and/or the other resins can be present, together with the vinyl addition polymer or the vinyl addition polymer and the polyfunctional epoxy compound(s), as a matrix component in the composition, in an amount of at most 98% by weight, based on the total weight of the matrix component. These epoxy resins and/or the other resins may be incorporated into the composition to facilitate the handling of the composition for molding and to decrease a cost thereof.

The vinyl addition polymer having at least one oxirane ring used in this aspect of the present composition has preferably a content of the monomer unit containing the oxirane ring of about 2 mole % or more for optimum results.

The carbon fiber composition can, if desired, contain an auxiliary component such as, for example, a hardner, a diluent, a pigment, a dye or any mixtures thereof.

The hardner which can be occasionally incorporated into the present composition includes, for example, boron trifluoride monoethylamine complex, dicyandiamide, p,p'-diaminodiphenylmethane, p,p'-diaminodiphenylsulfon and the like. The hardner can be preferably present in the composition in an amount of 2 to 50 parts by weight based on 100 parts by weight of the total matrix resin (i.e. the vinyl addition polymer, the polyfunction epoxy compound and the other resin).

This aspect of the present carbon fiber composition can be prepared by blending said constituents with one another by any conventional technique. The diluent such as epoxy compounds having a low molecular weight (e.g. butyl glycidyl ether) and suitable solvent can be effectively added to the composition to facilitate the processing operation for molding and to obtain a uniform composite free from void. In this case, the content of the matrix resin component in the compounding solution is generally within the range from 40 to 95% by weight, and preferably, within the range from 50 to 85% by weight.

The present carbon fiber composition can be, via a prepreg form or not, formed into various kind of articles by using any conventional molding technique such as a press molding technique, a filament winding technique, sheet winding technique and the like. Thus, it will be understood that the present carbon fiber composition contains (a) an A-stage composition which is prepared by only impregnating the carbon fiber with the matrix resin or its solution, (a) a B-stage composition (i.e. prepreg) which is prepared by semi-curing the A-stage composition under a moderate heating condition and (c) a C-stage composition which is prepared by curing the A or B-stage composition completely.

The carbon fiber composite materials according to the present invention have remarkably excellent physical properties of the composite compared to conventional composite materials consisting essentially of carbon fiber and bisphenol A diglycidylether type epoxy resin. Especially the interlaminar shear strength of the present composite materials is greater than that of the conventional composite materials by about 1–3 kg/mm$^2$.

Further, the present carbon fiber composition has the advantages that it can be formed into articles without a B-staging process and that they can be produced at a relatively low and commercially acceptable cost.

The carbon fiber contained, as a main constituent, in the present composition can be carbon fiber, graphite fiber, graphite whisker and the like, which can, if desired, be treated by any surface-finishing agents prior to compounding. These fiber and whisker can be those prepared from polyacrylonitrile fiber, rayon, pitch, aromatic hydrocarbons, carbon black and the like.

The present invention will be further illustrated by, but is by no means limited to, the following Examples.

EXAMPLE 1

In a 500 ml four-necked flask equipped with a stirrer, a reflux-condenser, a dropping funnel and a thermometer, 150 g of ethyl acetate was placed as a solvent and heated to 75° C while simultaneously replacing the atomsphere with nitrogen. A mixture of 55 g of methyl methacrylate, 35 g of butyl acrylate, 10 g of glycidyl methacrylate and 0.3 g of N,N'-azobisisobutyronitrile (polymerization catalyst) was introduced into the dropping funnel and was added dropwise into the flask over 2.5 hours. The content of the flask was heated a further 5.5 hours at 75° C and the reaction was completed. The conversion of polymerization was 96%. 950 g of ethyl acetate was added to 50 g of the polymerization solution so obtained and, thus, about 2% by weight of compounding agent solution was prepared.

Carbolon Z-2-1 ® (Registered Trade Mark, carbon fiber manufactured from Nippon Carbon Co., Ltd., intermediate products subjected to only surface oxidation treatment but not subjected to surface finishing treatment) was compounded with the compounding agent prepared above by using a bobbin sizer in such a manner that Carbolon Z-2-1 ® passed continuously through the bath of the compounding agent solution at a speed of 5 m/min. The single filaments of carbon fiber were fully impregnated with the compounding agent solution. Then, the compounded fiber was lightly squeezed between rollers, to remove the excess compounding agent solution, and dried for 1 minute at 80° C. The amount of the active ingredients of the compounding agent solution loaded on the carbon fibers was 1.6% by weight based on the weight of the carbon fibers.

By using a TM type yarn friction and rubbing tester the filaments integrity of the carbon fiber composition thus obtained was determined by rating it in accordance with the following criteria.

A: Only one, two or three fluffs are formed.
B: More than three fluffs are formed.
C: Fluffs are formed as a group.
D: Fluffs are formed over entire surface of the fiber.

The results thus obtained are shown in Table 1 together with those of the Comparative Example 1 set forth hereinbelow.

The carbon fibers were continuously impregnated with a resin solution comprising 900 g of Epikote 828 (a Registered Trade Mark, epoxy resin manufactured from Shell Co.), 36 g of boron trifluoride monoethyl amine complex and 100 g of methyl ethyl ketone. The carbon fibers picked up the resin solution were wound parallel to each other around a drum on which a silicone release paper was wound in advance and, then, the wound drum was heated at 130° C for 20 minutes to partially cure the resin layer on the drum. Thus, uni-directional prepreg of carbon fibers was obtained.

Thirteen plies of prepreg sheet thus obtained were laminated with one another in the same direction. The laminates were heated at 170° C under a pressure of 7 kg/cm² for 3 hours, and further heated at 170° C under atmospheric pressure for 2 hours. Thus, a uni-directional carbon fiber reinforced plastic (for brevity's sake, it is called "CFRP" hereinbelow) was prepared. The content of the carbon fiber in the CFRP was 58% by volume.

The interlaminar shear strength of the CFRP was determined according to a method of ASTM D 2344, in which the thickness of the test pieces was 2 mm. The result is shown in Table 2 together with that of the following Comparative Example 1.

COMPARATIVE EXAMPLE 1

Carbolon Z-2-1 ® was compounded with a compounding agent which was prepared by replacing the copolymer of methyl methacrylate/butyl acrylate/glycidyl methacrylate with a 4:1 mixture of Epikote 1004 and Epikote 828 (both a Registered Trademark, epoxy resin manufactured from Shell Co.) following procedure similar to that in Example 1. The loading amount of the active ingredients of the compounding agent onto the carbon fibers was 1.6% by weight based on the weight of the carbon fiber.

Then, the filament integrity of the carbon fiber composition and the interlaminar shear strength of the CFRP prepared from the carbon fiber composition in the same manner as in Example 1 were determined as in Example 1. The results are shown in Tables 1 and 2 together with those of Example 1.

Further, as a blank test, the filament integrity of no compounding Carbolon Z-2-1 ® and the interlaminar shear strength of the CFRP prepared therefrom in the same manner as in Example 1 containing 58% by volume of no compounding Carbolon Z-2-1 ®, were also determined in the same manner as in Example 1. The results are also shown in Tables 1 and 2.

Table 1

| Friction Number Example | 10 times | 30 times | 50 times |
|---|---|---|---|
| Example 1 | A | A | B |
| Comparative Example 1 | C | D | D |
| Blank Test (no compounding) | D | D | D |

Table 2

| Example | Interlaminar Shear Strength (kg/mm²) |
|---|---|
| Example 1 | 6.74 |
| Comparative Example 1 | 5.59 |
| Blank Test (no compounding) | 4.62 |

EXAMPLE 2

The compounding of a carbon fiber was effected using the same procedure as in Example 1, except that Magnamite HT-S (a Registered Trade Mark, carbon fiber manufactured from Hercules Inc. which fiber was subjected to only surface oxidation treatment but not surface-finishing treatment) was used instead of Carbolon Z-2-1 ® and CFRP was prepared therefrom in the same manner as in Example 1. The interlaminar shear strength of the CFRP containing 55% by volume of the carbon fiber composition was determined in the same manner as in Example 1. The result is shown in Table 3 below together with that of the following Comparative Example 2.

COMPARATIVE EXAMPLE 2

Magnamite HT-S was compounded using the same procedure as in Comparative Example 1 except that Magnamite HT-S was used instead of Carbolon Z-2-1 ® and CFRP was prepared therefrom in the same manner as in Example 1. The inter-laminar shear strength of the CFRP containing 55% by volume of the carbon fiber composition was determined and the result is shown in Table 3 below together with that of Example 2.

Further, as a blank test, CFRP containing 55% by volume of carbon fiber was prepared from Magnamite HT-S and the interlaminar shear strength thereof was determined in the same manner as in Example 1. The result is shown in Table 3.

Table 3

| Example | Interlaminar Shear Strength (kg/mm²) |
|---|---|
| Example 2 | 7.84 |
| Comparative Example 2 | 6.14 |
| Blank test (no compounding) | 6.12 |

EXAMPLE 3 – 7

Carbon fibers (Carbolon Z-2-1 ®) were compounded using the same procedure as in Example, except that the compounding agents having a composition listed in Table 4 below were used instead of the methyl methacrylate/butyl acrylate/glycidyl methacrylate copolymer. Composite materials were prepared from the carbon fiber compositions in the same manner as in Example 1. The filament integrity of the carbon fiber composition and the interlaminar shear strengths of the composite materials were determined in the same manner as in Example 1. The loading amounts of the active ingredients of the compounding agent onto the carbon fibers were 1.5–1.7% by weight and the carbon fiber contents of the CFRPs were 58–60% by volume. The results are shown in Table 4, together with those of the following Comparative Examples 3 and 4.

COMPARATIVE EXAMPLES 3 AND 4

Carbon fibers (Carbolon Z-2-1 ®) were compounded using the same procedure as used in Comparative Example 1, except that the compounding agents having compositions listed in Table 4 below were used instead of the 4:1 mixture of Epikote 1004 and Epikote 828. Composite materials were prepared from the carbon fibers in the same manner as in Example 1. The filament integrity of the carbon fiber compositions and the interlaminar shear strengths of the composite materials were determined in the same manner as in Example 1. The loading amounts of the active ingredients of the compounding agents onto the carbon fibers were 1.5–1.7% by weight and the carbon fiber contents of the CFRPs were 58–60% by volume. The results are shown in Table 4 below together with those of Examples 3–7.

pounding agent solution obtained above by using a bobbin sizer in the following manner. That is, the carbon fiber passed continuously through the compounding solution bath at a speed of 6 m/min. The single filaments of carbon fiber were fully impregnated with the compounding agent. Then, the compounded fiber was lightly squeezed between squeezing rollers to remove the excess compounding agent solution, and dried for one minute at 75° C. The amount of the active ingredients of the compounding agent loaded on the carbon fiber was 2.2% by weight based on the weight of the carbon fibers. The carbon fiber composition thus obtained was very flexible.

By using a TM type yarn friction and rubbing tester the filament integrity of the carbon fiber composition thus obtained was determined by rating it in accordance with the following criteria.

A. Only one, two or three fluffs are formed.
B. More than three fluffs are formed.
C. Fluffs are formed as a group.
D. Fluffs are formed over entire surface of the fiber.

The results thus obtained are shown in Table 5.

Table 5

| Friction Number | 10 times | 30 times | 50 times |
|---|---|---|---|
| Filament Integrity Rating | B | B | C |

The carbon fiber composition thus obtained was continuously impregnated with a resin solution comprising 40 parts of Epikote ® 828 (a Registered Trademark, Table 4

| Example | Compounding Agent Composition | | | | Filament Integrity[2] (Friction number) (times) | | | | Interlaminar Shear Strength[2] of Composite Material (kg/mm$^2$) |
|---|---|---|---|---|---|---|---|---|---|
| | Copolymer Composition mole % | | | Additives (% by weight) | | | | | |
| | MMA[1] | BA[1] | GMA[1] | | 10 | 30 | 50 | 100 | |
| Example 3 | 40 | 31 | 29 | — | A | B | C | D | 6.60 |
| Example 4 | 60 | 30 | 10 | Polyethylene glycol (20) | A | A | B | B | 6.70 |
| Example 5 | 60 | 30 | 10 | Stearic acid (2) | A | A | B | B | 6.41 |
| Example 6 | 53 | 29 | 18 | — | A | A | B | B | 6.59 |
| Example 7 | 53 | 29 | 18 | Polyethylene Glycol monostearate (15) | A | A | A | B | 6.53 |
| Comparative Example 3 | Epikote 1004 (Shell) 64 wt. % Epikote 828 (Shell) 16 wt. % Polyethylene glycol 20 wt. % | | | | C | C | D | D | 5.44 |
| Comparative Example 4 | Epikote 1001 (Shell) 90 wt. % Epikote 828 (Shell) 10 wt. % | | | | C | D | D | D | 5.38 |

[1]MMA : methyl methacrylate BA : butyl acrylate GMA : glycidyl methacrylate
[2]see Example 1

EXAMPLE 8

15 g of N,N,N',N'-tetraglycidyl-bis(p-aminophenyl) methane and 5 g of methyl methacrylate/butyl acrylate/glycidyl methacrylate terpolymer (mole ratio: 37/22/41) which was prepared by the conventional solution polymerization technique, were dissolved into 980 g of methyl ethyl ketone and, thus, a compounding agent solution was prepared.

Polyacrylonitrile fiber was heated to, finally, about 1300° C, and high strength filaments of carbon fiber having a tensile strength of 300 kg/mm$^2$ and a tensile modulus of 23 t/mm$^2$ was prepared. The tow of the carbon fiber consisting of about six thousands single filaments having a diameter of about 8 micron was surface-oxidized with a potassium dichromate in sulfuric acid solution and, then, was compounded with the compounding agent solution obtained above by using a epoxy resin manufactured from Shell Co.), 40 parts of ECN 1235 (polyglycidyl ether of o-cresol formaldehyde novolak, manufactured from Ciba-Geigy Co.), 4 parts of boron trifluoride monoethylamine complex and 16 parts of acetone by using a drum winder type impregnation machine. The tow of carbon fiber composition picking up the resin solution was wound parallel to each other around a drum having, on its surface, a release paper subjected to silicone treatment and then, after evaporating the solvent contained in the resin solution, it was heated for 15 minutes at a temperature of 130° C. Thus, a uni-directional prepreg of a carbon fiber composition was obtained.

Eleven sheets of prepreg thus obtained having a length of 280 mm and a width of 30 mm were laminated. The laminates were heated at 130° C for 30 minutes and then at 170° C for 1 hour under a pressure of 7 kg/cm$^2$ between hot plates of a hydraulic press, and further heated at 170° C for 2 hours in an oven for postcuring.

The content of the carbon fiber in the CFRP thus prepared was 57% by volume and the interlaminar shear strength of the CFRP determined according to the method of ASTM D 2344 was 9.38 kg/mm².

EXAMPLE 9

A carbon fiber composition and CFRP were prepared in the same manner as in Example 8, except that a compounding agent solution comprising 10 g of N,N,N',N'-tetraglycidyl-bis(p-aminophenyl)methane, 10 g of methyl methacrylate/butyl acrylate/glycidyl methacrylate terpolymer (mole ratio: 37/22/41) obtained by using a solution polymerization technique and 980 g of methyl ethyl ketone was used.

The amount of the active ingredients of the compounding agent loaded on the carbon fiber was 2.2% by weight and the carbon fiber composition thus obtained was very flexible. The filament integrity of the carbon fiber composition determined as in Example 8 is shown in the following Table 6.

Table 6

| Friction Number | 10 times | 30 times | 50 times |
| --- | --- | --- | --- |
| Filament Integrity Rating | A | B | B |

The content of the carbon fiber in the CFRP was 58% by volume and the interlaminar shear strength of the CFRP was 9.22 kg/mm².

EXAMPLE 10

A carbon fiber composition and CFRP were prepared in the same manner as in Example 8, except that a compounding agent solution comprising 5 g of N,N,N',N'-tetraglycidyl-bis(p-aminophenyl)methane, 15 g of methyl methacrylate/butyl acrylate/glycidyl methacrylate terpolymer (mole ratio: 37/22/41) obtained by using a solution polymerization technique and 980 g of methyl ethyl ketone was used.

The amount of the active ingredients of the compounding agent loaded on the carbon fiber was 2.3% by weight and the carbon fiber composition thus obtained was very flexible. The filament integrity of the carbon fiber composition determined as in Example 8 is shown in the following Table 7.

Table 7

| Friction Number | 10 times | 30 times | 50 times |
| --- | --- | --- | --- |
| Filament Integrity Rating | A | B | B |

The content of the carbon fiber in the CFRP was 59% by volume and the interlaminar shear strength of the CFRP was 9.25 kg/mm².

EXAMPLE 11

A carbon fiber composition and CFRP were prepared in the same manner as in Example 8, except that a compounding agent solution comprising 10 g of N,N,N',N'-triglycidyl-bis(p-aminophenyl)methane, 10 g of methyl methacrylate/butylacrylate/glycidyl methacrylate terpolymer (mole ratio: 37/22/41) obtained by using a solution polymerization technique and 980 g of methyl ethyl ketone was used.

The amount of the active ingredients of the compounding agent loaded on the carbon fiber was 2.0% by weight and the carbon fiber composition thus obtained was very flexible. The filament integrity of the carbon fiber composition determined as in Example 8 is shown in the following Table 8.

Table 8

| Friction Number | 10 times | 30 times | 50 times |
| --- | --- | --- | --- |
| Filament Integrity Rating | A | B | C |

The content of the carbon fiber in the CFRP was 57% by volume and the interlaminar shear strength of the CFRP was 8.88 kg/mm².

EXAMPLE 12

A carbon fiber composition and CFRP were prepared in the same manner as in Example 8, except that a compounding agent solution comprising 10 g of N,N,N',N'-tetraglycidyl-bis(p-aminophenyl)methane, 10 g of styrene/butyl acrylate/glycidyl methacrylate terpolymer (mole ratio: 33/24/43) obtained by using a solution polymerization technique and 980 g of methyl ethyl ketone was used.

The amount of the active ingredients of the compounding agent loaded on the carbon fiber was 2.2% by weight and the carbon fiber composition thus obtained was very flexible. The filament integrity of the carbon fiber composition determined as in Example 8 is shown in the following Table 9.

Table 9

| Friction Number | 10 times | 30 times | 50 times |
| --- | --- | --- | --- |
| Filament Integrity Rating | A | B | B |

The content of the carbon fiber in the CFRP was 58% by volume and the interlaminar shear strength of the CFRP was 9.03 kg/mm².

COMPARATIVE EXAMPLE 5

A carbon fiber composition and CFRP were prepared in the same manner as in Example 8, except that a resin solution comprising 8 g of Epikote ® 828, 12 g of Epikote ® 1001 and 980 g of methyl ethyl ketone was used instead of the compounding agent solution of Example 8.

The amount of the active ingredients of the resin solution loaded on the carbon fiber was 2.1% by weight. The filament integrity of the carbon fiber composition determined as in Example 8 is shown in the following Table 10.

Table 10

| Friction Number | 10 times | 30 times | 50 times |
| --- | --- | --- | --- |
| Filament Integrity Rating | C | D | D |

The content of the carbon fiber in the CFRP was 60% by volume and the interlaminar shear strength of the CFRP was 7.45 kg/mm².

EXAMPLE 13

15 g of N,N,O-triglycidyl-p-aminophenol and 5 g of methyl methacrylate/butyl acrylate/glycidyl methacrylate terpolymer obtained by using the conventional solution polymerization technique were dissolved into a mixture of 490 g of methyl ethyl ketone and 490 g of ethyl alcohol and, thus, a compounding agent solution was prepared.

Polyacrylonitrile fiber was heated to, finally, about 1300° C, and high strength filament of carbon fiber having a tensile strength of 300 kg/mm² and a tensile modulus of 23 t/mm² were prepared. The tow of the carbon fiber consisting of about six thousands single filaments having a diameter of about 8 micron was surface-oxidized with a potassium dichromate in sulfuric acid solution and, then, was compounded with the compounding agent solution obtained above by using a bobbin sizer in the following manner. That is, the carbon fiber passed continuously through the compounding solution bath at a speed of 6 m/min. The single filaments were fully impregnated with the compounding agent. Then, the compounded fiber was lightly squeezed between squeezing rollers to remove the excess compounding agent solution, and dried for one minute at 75° C. The amount of the active ingredients of the compounding agent loaded on the carbon fiber was 2.4% by weight based on the weight of the carbon fibers. The carbon fiber composition thus obtained was very flexible.

By using a TM type yarn friction and rubbing tester, the filament integrity of the carbon fiber composition thus obtained was determined by rating it in accordance with the criteria shown below. The test was carried out under a 200 g load.

A. Only one, two or three fluffs are formed.
B. More than three fluffs are formed.
C. Fluffs are formed as a group.
D. Fluffs are formed over entire surface of the fiber.

The results thus obtained are shown in Table 11.

Table 11

| Friction Number | 10 times | 30 times | 50 times |
|---|---|---|---|
| Filament Integrity Rating | B | B | C |

The carbon fiber composition thus obtained was continuously impregnated with a resin solution comprising 40 parts of Epikote ® 828, 40 parts of ECN 1235, 4 parts of boron trifluoride monoethylamine complex and 16 parts of acetone by using a drum winder type impregnation machine. The tow of carbon fiber picking up the resin solution was wound parallel to each other around a drum having, on its surface, a release paper subjected to silicone treatment and then, after evaporating the solvent contained in the resin solution, they were heated for 15 minutes at a temperature of 130° C. Thus, a prepreg of a carbon fiber composition was obtained.

Eleven sheets of prepreg thus obtained having a length of 280 mm and a width of 30 mm were laminated. The laminates were heated at 130° C for 30 minutes and then at 170° C for 1 hour under a pressure of 7 kg/cm² between hot plates of a hydraulic press, and further heated at 170° C for 2 hours in an oven for postcuring.

The content of the carbon fiber in the CFRP thus prepared was 57% by volume and the interlaminar shear strength of the CFRP determined according to a method of ASTM D 2344 was 9.19 kg/mm².

EXAMPLE 14

A carbon fiber composition and CFRP were prepared in the same manner as in Example 13, except that a compounding agent solution comprising 10 g of N,N,O-triglycidyl-p-aminophenol, 10 g of methyl methacrylate/butyl acrylate/glycidyl methacrylate terpolymer (mole ratio: 37/22/41) obtained by using the conventional solution polymerization technique and a mixture of 490 g of methyl ethyl ketone and 490 g of ethyl alcohol was used.

The amount of the active ingredients of the compounding agent loaded on the carbon fiber was 2.2% by weight and the carbon fiber composition thus obtained was very flexible. The filament integrity of the carbon fiber composition determined as in Example 13 is shown in the following Table 12.

Table 12

| Friction Number | 10 times | 30 times | 50 times |
|---|---|---|---|
| Filament Integrity Rating | A | B | B |

The content of the carbon fiber in the CFRP was 59% by volume and the interlaminar shear strength of the CFRP was 8.92 kg/mm².

EXAMPLE 15

A carbon fiber composition and CFRP were prepared in the same manner as in Example 13, except that a compounding agent solution comprising 5 g of N,N,O-triglycidyl-p-aminophenol, 15 g of methyl methacrylate/butyl acrylate/glycidyl methacrylate terpolymer (mole ratio: 37/22/41) obtained by using the conventional solution polymerization technique and a mixture of 490 g of methyl ethyl ketone and 490 g of ethyl alcohol was used.

The amount of the active ingredients of the compounding agent loaded on the carbon fiber was 2.1% by weight and the carbon fiber composition thus obtained was very flexible. The filament integrity of the carbon fiber composition determined as in Example 13 is shown in the following Table 13.

Table 13

| Friction Number | 10 times | 30 times | 50 times |
|---|---|---|---|
| Filament Integrity Rating | A | B | B |

The content of the carbon fiber in the CFRP was 56% by volume and the interlaminar shear strength of the CFRP was 9.04 kg/mm².

EXAMPLE 16

A carbon fiber composition and CFRP were prepared in the same manner as in Example 13, except that a compounding agent solution comprising 10 g of N,N,O,O'-tetraglycidyl-4-aminoresorcinol, 10 g of methyl methacrylate/butyl acrylate/glycidyl methacrylate terpolymer (mole ratio: 37/22/41) obtained by using the conventional solution polymerization technique and a mixture of 490 g of methyl ethyl ketone and 490 g of ethyl alcohol was used.

The amount of the active ingredients of the compounding agent loaded on the carbon fiber was 2.3% by weight and the carbon fiber composition thus obtained was very flexible. The filament integrity of the carbon fiber composition determined as in Example 13 is shown in the following Table 14.

Table 14

| Friction Number | 10 times | 30 times | 50 times |
|---|---|---|---|
| Filament Integrity Rating | A | B | C |

The content of the carbon fiber in the CFRP was 57% by volume and the interlaminar shear strength of the CFRP was 9.11 kg/mm².

EXAMPLE 17

A carbon fiber composition and CFRP were prepared in the same manner as in Example 13, except that a compounding agent solution comprising 10 g of N,N,O-triglycidyl-p-aminophenol, 10 g of styrene/butyl acrylate/glycidyl methacrylate terpolymer (mole ratio: 33/24/43) obtained by using the conventional solution polymerization technique and a mixture of 650 g of methyl ethyl ketone and 330 g of ethyl alcohol was used.

The amount of the active ingredients of the compounding agent loaded on the carbon fiber was 2.3% by weight and the carbon fiber composition thus obtained was very flexible. The filament integrity of the carbon fiber composition determined as in Example 13 is shown in the following Table 15.

Table 15

| Friction Number | 10 times | 30 times | 50 times |
|---|---|---|---|
| Filament Integrity Rating | A | B | B |

The content of the carbon fiber in the CFRP was 59% by volume and the interlaminar shear strength of the CFRP was 8.84 kg/mm².

EXAMPLE 18

10 g of N,N,N',N'-tetraglycidyl methaxylylenediamine and 10 g of methyl methacrylate/butyl acrylate/glycidyl methacrylate terpolymer (mole ratio: 35/25/40) which was prepared by the conventional solution polymerization technique, were dissolved into 490 g of methyl ethyl ketone and 490 g of methyl alcohol and, thus, a compounding agent solution was prepared.

Polyacrylonitrile fiber was heated to, finally, about 1300° C, and high strength filaments of carbon fiber having a tensile strength of 300 kg/mm² and a tensile modulus of 23 t/mm² was prepared. The tow of the carbon fiber consisting of about six thousands single filaments having a diameter of about 8 micron was surface-oxidized with a potassium dichromate in sulfuric acid solution and, then, was compounded with the compounding agent solution obtained above by using a bobbin sizer in the following manner. That is, the carbon fiber passed continuously through the compounding solution bath at a speed of 6 m/min. The single filaments of carbon fiber were fully impregnated with the compounding agent. Then, the compounded fiber was lightly squeezed between squeezing rollers to remove the excess compounding agent solution, and dried for one minute at 70° C. The amount of the active ingredients of the compounding agent loaded on the carbon fiber was 2.4% by weight based on the weight of the carbon fibers.

By using a TM type yarn friction and rubbing tester, the filament integrity of the carbon fiber composition thus obtained was determined by rating it in accordance with the following criteria.

A: Only one, two or three fluffs are formed.
B: More than three fluffs are formed.
C: Fluffs are formed as a group.
D: Fluffs are formed over entire surface of the fiber.

The results thus obtained are shown in Table 16.

Table 16

| Friction Number | 10 times | 30 times | 50 times |
|---|---|---|---|
| Filament Integrity Rating | A | B | B |

The carbon fiber composition thus obtained was impregnated with a resin solution comprising 43 parts of Epikote ® 828, 43 parts of ECN 1235 (polyglycidyl ether of o-cresol formaldehyde novolak), 4 parts of boron trifluoride monoethylamine complex and 10 parts of acetone by using a drum winder type impregnation machine. The tow of the carbon fiber composition picking up the resin solution was wound parallel to each other around a drum having, on its surface, a release paper subjected to silicone treatment and then, it was heated for 20 minutes at a temperature of 130° C. Thus, a uni-directional prepreg of a carbon fiber composition was obtained.

Eleven sheets of prepreg thus obtained having a length of 280 mm and a width of 100 mm were laminated. The laminates were heated at 130° C for 30 minutes and then at 170° C for 1 hour under a pressure of 7 kg/cm² between hot plates of a hydraulic press, and further heated at 170° C for 2 hours in an oven for postcuring.

The content of the carbon fiber in the CFRP thus prepared was 60% by volume and the interlaminar shear strength of the CFRP determined according to the method of ASTM D 2344 was 9.24 kg/mm² and the bending strength of the CFRP was 163 kg/mm².

EXAMPLE 19

A carbon fiber composition was prepared in the same manner as in Example 18, except that a compounding solution comprising 10 g of 1-(N,N-diglycidyl aminomethyl)-3-(N',N'-diglycidyl aminomethyl) cyclohexane, 10 g of methyl methacrylate/butyl acrylate/glycidyl methacrylate terpolymer (mole ratio: 37/22/41) obtained by using a conventional solution polymerization technique and 980 g of methyl ethyl ketone was used.

The amount of the active ingredients of the compounding agent loaded on the carbon fiber was 2.2% by weight and the carbon fiber composition thus obtained was very flexible. The filament integrity of the carbon fiber composition determined as in Example 18 is shown in the following Table 17.

Table 17

| Friction Number | 10 times | 30 times | 50 times |
|---|---|---|---|
| Filament Integrity Rating | A | B | B |

A CFRP was prepared from the carbon fiber composition thus obtained, in the same manner as in Example 18, except that eleven sheets of prepreg having a length of 280 mm and a width of 30 mm was used.

The content of the carbon fiber in the CFRP was 59% by volume and the interlaminar shear strength of the CFRP was 9.35 kg/mm².

EXAMPLE 20

10 g of novolak type epoxy resin having an epoxy equivalent of 175 which was prepared by reacting novolak type phenol resin and epichlorohydrin in the presence of alkali, and 10 g of methyl methacrylate/butyl acrylate/glycidyl methacrylate terpolymer (mole ratio: 37/22/41) which was prepared by the conventional solution polymerization technique, were dissolved into 980 g of acetone and, thus, a compounding agent solution was prepared.

Polyacrylonitrile fiber was heated to, finally, about 1300° C and high strength filaments of carbon fiber having a tensile strength of 300 kg/mm$^2$ and a tensile modulus of 23 t/mm$^2$ was prepared. The tow of the carbon fiber consisting of about six thousands single filaments having a diameter of about 8 micron was surface-oxidized with a potassium dichromate in sulfuric acid solution and, then, was compounded with the compounding agent solution obtained above by using a bobbin sizer in the following manner. That is, the carbon fiber passed continuously through the compounding solution bath at a speed of 6 m/min. The single filaments of carbon fiber were fully impregnated with the compounding agent. Then, the compounded fiber was lightly squeezed between squeezing rollers to remove the excess compounding agent solution, and dried for one minute at 75° C. The amount of the active ingredients of the compounding agent loaded on the carbon fiber was 2.2% by weight based on the weight of the carbon fibers. The carbon fiber composition thus obtained was very flexible.

By using a TM type yarn friction and rubbing tester (load: 200 g), the filament integrity of the carbon fiber composition thus obtained was determined by rating it in accordance with the following criteria.

A: Only one, two or three fluffs are formed.
B: More than three fluffs are formed.
C: Fluffs are formed as a group.
D: Fluffs are formed over entire surface of the fiber.

The results thus obtained are shown in Table 18.

Table 18

| Friction Number | 10 times | 30 times | 50 times |
|---|---|---|---|
| Filament Integrity Rating | A | B | B |

The carbon fiber composition thus obtained was continuously impregnated with a resin solution comprising 40 parts of Epikote ® 828, 40 parts of ECN 1235 (polyglycidyl ether of o-cresol formaldehyde novolak), 4 parts of boron trifluoride monoethylamine complex and 16 parts of acetone by using a drum winder type impregnation machine. The tow of carbon fiber composition picking up the resin solution was wound parallel to each other around a drum having, on its surface, a release paper subjected to silicone treatment and then, after evaporating the solvent contained in the resin solution, it was heated for 15 minutes at a temperature of 130° C. Thus, a uni-directional prepreg of a carbon fiber composition was obtained.

Eleven sheets of prepreg thus obtained having a length of 280 mm and a width of 30 mm were laminated. The laminates were heated at 130° C for 30 minutes and then at 170° C for 1 hour under a pressure of 7 kg/cm$^2$ between hot plates of a hydraulic press, and further heated at 170° C for 2 hours in an oven for postcuring.

The content of the carbon fiber in the CFRP thus prepared was 56% by volume and the interlaminar shear strength of the CFRP determined according to the method of ASTM D 2344 was 9.10 kg/mm$^2$.

EXAMPLE 21

A carbon fiber composition and CFRP were prepared in the same manner as in Example 20, except that a compounding agent solution comprising 15g of novolak type epoxy resin having an epoxy equivalent of 172 which was prepared by reacting novolak type phenol resin with epichlorohydrin in the presence of alkali, 5 g of methyl methacrylate/butyl acrylate/glycidyl methacrylate terpolymer (mole ratio: 37/22/41) obtained by using a solution polymerization technique and 980 g of acetone was used.

The amount of the active ingredients of the compounding agent loaded on the carbon fiber was 2.4% by weight and the carbon fiber composition thus obtained was very flexible. The filament integrity of the carbon fiber composition determined as in Example 20 is shown in the following Table 19.

Table 19

| Friction Number | 10 times | 30 times | 50 times |
|---|---|---|---|
| Filament Integrity Rating | B | B | C |

The content of the carbon fiber in the CFRP was 58% by volume and the interlaminar shear strength of the CFRP was 9.03 kg/mm$^2$.

EXAMPLE 22

A carbon fiber composition and CFRP were prepared in the same manner as in Example 20, except that a compounding agent solution comprising 10 g of EPN 1138 (polyfunctional novolak type epoxy resin, manufactured from Ciba-Geigy Co.), 10 g of styrene/butyl acrylate/glycidyl methacrylate terpolymer (mole ratio: 33/24/43) obtained by using a solution polymerization technique and 980 g of acetone was used.

The amount of the active ingredients of the compounding agent loaded on the carbon fiber was 2.0% by weight and the carbon fiber composition thus obtained was very flexible. The filament integrity of the carbon fiber composition determined as in Example 20 is shown in the following Table 20.

Table 20

| Friction Number | 10 times | 30 times | 50 times |
|---|---|---|---|
| Filament Integrity Rating | A | B | B |

The content of the carbon fiber in the CFRP was 58% by volume and the interlaminar shear strength of the CFRP was 8.97 kg/mm$^2$.

EXAMPLE 23

A carbon fiber composition and CFRP were prepared in the same manner as in Example 20, except that a compounding agent solution comprising 10 g of ECN 1235, 10 g of methyl methacrylate/butyl acrylate/glycidyl methacrylate terpolymer (mole ratio: 37/22/41) obtained by using a solution polymerization technique and 980 g of acetone was used.

The amount of the active ingredients of the compounding agent loaded on the carbon fiber was 2.1% by weight and the carbon fiber composition thus obtained was very flexible. The filament integrity of the carbon fiber composition determined as in Example 20 is shown in the following Table 21.

Table 21

| Friction Number | 10 times | 30 times | 50 times |
|---|---|---|---|
| Filament Integrity Rating | A | B | B |

The content of the carbon fiber in the CFRP was 59% by volume and the interlaminar shear strength of the CFRP was 9.20 kg/mm$^2$.

EXAMPLE 24

15 g of glycerin triglycidyl ether and 5 g of methyl methacrylate/butyl acrylate/glycidyl methacrylate terpolymer (mole ratio: 37/22/41) which was prepared by the conventional solution polymerization technique, were dissolved into 980 g of methyl ethyl ketone and, thus, a compounding agent solution was prepared.

Polyacrylonitrile fiber was heated to, finally, about 1300° C, and high strength filaments of carbon fiber having a tensile strength of 300 kg/mm$^2$ and a tensile modulus of 23 t/mm$^2$ was prepared. The tow of the carbon fiber consisting of about six thousands single filaments having a diameter of about 8 micron was surface-oxidized with a potassium dichromate in sulfuric acid solution and, then, was compounded with the compounding agent solution obtained above by using a bobbin sizer in the following manner. That is, the carbon fiber passed continuously through the compounding solution bath at a speed of 6 m/min. The single filaments of carbon fiber were fully impregnated with the compounding agent. Then, the compounded fiber was lightly squeezed between squeezing rollers to remove the excess compounding agent solution, and dried for one minute at 75° C. The amount of the active ingredients of the compounding agent loaded on the carbon fiber was 2.3% by weight based on the weight of the carbon fibers. The carbon fiber composition thus obtained was very flexible.

By using a TM type yarn friction and rubbing tester (load: 200 g), the filament integrity of the carbon fiber composition thus obtained was determined by rating it in accordance with the following criteria.

A: Only one, two or three fluffs are formed.
B: More than three fluffs are formed.
C: Fluffs are formed as a group.
D: Fluffs are formed over entire surface of the fiber.

The results thus obtained are shown in Table 22.

Table 22

| Friction Number | 10 times | 30 times | 50 times |
|---|---|---|---|
| Filament Integrity Rating | B | B | C |

The carbon fiber composition thus obtained was continuously impregnated with a resin solution comprising 40 parts of Epikote ® 828, 40 parts of ECN 1235 (polyglycidyl ether of o-cresol formaldehyde novolak), 4 parts of boron trifluoride monoethylamine complex and 16 parts of acetone by using a drum winder type impregnation machine. The tow of carbon fiber composition picking up the resin solution was wound parallel to each other around a drum having, on its surface, a release paper suabjected to silicon treatment and then, after evaporating the solvent contained in the resin solution, it was heated for 15 minutes at a temperature of 130° C. Thus, a uni-directional prepreg of a carbon fiber composition was obtained.

Eleven sheets of prepreg thus obtained having a length of 280 mm and a width of 30 mm were laminated. The laminates were heated at 130° C for 30 minutes and then at 170° C for 1 hour under a pressure of 7 kg/cm$^2$ between hot plates of a hydraulic press, and further heated at 170° C for 2 hours in an oven for postcuring.

The content of the carbon fiber in the CFRP thus prepared was 56% by volume and the interlaminar shear strength of the CFRP determined according to the method of ASTM D 2344 was 9.07 kg/mm$^2$.

EXAMPLE 25

A carbon fiber composition and CFRP were prepared in the same manner as in Example 24, except that a compounding agent solution comprising 10 g of glycerine triglycidyl ether, 10 g of methyl methacrylate/butyl acrylate/glycidyl methacrylate terpolymer (mole ratio: 37/22/41) obtained by using a solution polymerization technique and 980 g of methyl ethyl ketone was used.

The amount of the active ingredients of the compounding agent loaded on the carbon fiber was 2.1% by weight and the carbon fiber composition thus obtained was very flexible. The filament integrity of the carbon fiber composition determined as in Example 24 is shown in the following Table 23.

Table 23

| Friction Number | 10 times | 30 times | 50 times |
|---|---|---|---|
| Filament Integrity Rating | A | B | B |

The content of the carbon fiber in the CFRP was 58% by volume and the interlaminar shear strength of the CFRP was 8.90 kg/mm$^2$.

EXAMPLE 26

A carbon fiber composition and CFRP were prepared in the same manner as in Example 24, except that a compounding agent solution comprising 5 g of glycerin triglycidyl ether, 15 g of methyl methacrylate/butyl acrylate/glycidyl methacrylate terpolymer (mole ratio: 37/22/41) obtained by using a solution polymerization technique and 980 g of methyl ethyl ketone was used.

The amount of the active ingredients of the compounding agent loaded on the carbon fiber was 2.0% by weight and the carbon fiber composition thus obtained was very flexible. The filament integrity of the carbon fiber composition determined as in Example 24 is shown in the following Table 24.

Table 24

| Friction Number | 10 times | 30 times | 50 times |
|---|---|---|---|
| Filament Integrity Rating | A | B | B |

The content of the carbon fiber in the CFRP was 55% by volume and the interlaminar shear strength of the CFRP was 9.00 kg/mm$^2$.

EXAMPLE 27

A carbon fiber composition and CFRP were prepared in the manner as in Example 24, except that a compounding agent solution comprising 10 g of 1,1,2-trihydroxymethylpropane triglycidyl ether, 10 g of methyl methacrylate/butyl acrylate/glycidyl methacrylate terpolymer (mole ratio: 37/22/41) obtained by using a solution polymerization technique and 980 g of methyl ethyl ketone was used.

The amount of the active ingredients of the compounding agent loaded on the carbon fiber was 2.3% by weight and the carbon fiber composition thus obtained was very flexible. The filament integrity of the carbon fiber composition determined as in Example 24 is shown in the following Table 25.

Table 25

| Friction Number | 10 times | 30 times | 50 times |
|---|---|---|---|
| Filament Integrity Rating | A | B | C |

The content of the carbon fiber in the CFRP was 55% by volume and the interlaminar shear strength of the CFRP was 9.16 kg/mm².

EXAMPLE 28

A carbon fiber composition and CRFP were prepared in the same manner as in Example 24, except that a compounding agent solution comprising 10 g of pentaerythritol tetraglycidyl ether, 10 g of methyl methacrylate/butyl acrylate/glycidyl methacrylate terpolymer (mole ratio: 33/24/43) obtained by using a solution polymerization technique and 980 g of methyl ethyl ketone was used.

The amount of the active ingredients of the compounding agent loaded on the carbon fiber was 2.2% by weight and the carbon fiber composition thus obtained was very flexible. The filament integrity of the carbon fiber composition determined as in Example 24 is shown in the following Table 26.

Table 26

| Friction Number | 10 times | 30 times | 50 times |
|---|---|---|---|
| Filament Integrity Rating | A | B | B |

The content of the carbon fiber in the CFRP was 58% by volume and the interlaminar shear strength of the CFRP was 9.27 kg/mm².

EXAMPLE 29

A carbon fiber composition and CFRP were prepared in the same manner as in Example 24, except that a compounding agent solution comprising 10 g of pentaerythritol tetraglycidyl ether, 10 g of styrene/butyl acrylate/glycidyl methacrylate terpolymer (mole ratio: 33/24/43) obtained by using a solution polymerization technique and 980 g of methyl ethyl ketone was used.

The amount of the active ingredients of the compounding agent loaded on the carbon fiber was 2.2% by weight and the carbon fiber composition thus obtained was very flexible. The filament integrity of the carbon fiber composition determined as in Example 24 is shown in the following Table 27.

Table 27

| Friction Number | 10 times | 30 times | 50 times |
|---|---|---|---|
| Filament Integrity Rating | A | B | B |

The content of the carbon fiber in the CFRP was 58% by volume and the interlaminar shear strength of the CFRP was 9.12 kg/mm².

EXAMPLE 30

In a 500 ml four-necked flask equipped with a stirrer, a reflux-condenser, a dropping funnel and a thermometer, 300 g of ethyl acetate was placed as a solvent and heated to 80° C while simultaneously replacing the atmosphere with nitrogen. A mixture of 70 g of methyl methacrylate, 50 g of butyl acrylate, 80 g of glycidyl methacrylate and 0.8 g of N,N'-azobisisobutyronitrile (polymerization catalyst) was introduced into the dropping funnel and was added dropwise into the flask over 2.5 hours. The content of the flask was heated a further 6.5 hours at 80° C and the reaction was completed. The conversion of polymerization was 95%.

Into 200 g of the polymer solution thus obtained (resin content = 76 g) 304 g of Epikote ® 828, 19 g of boron trifluoride monoethyl amine complex and 142 g of ethyl acetate was added and mixed, and, thus, a matrix resin solution was prepared.

Polyacrylonitrile fiber was heated to, finally, about 1300° C, and high strength carbon fiber having a tensile strength of 300 kg/mm² and a tensile modulus of 25 t/mm² was prepared. The tow of the carbon fiber consisting of about ten thousand single filaments having a diameter of about 8 micron was surface-oxidized with a potassium dichromate in sulfuric acid solution, and, then, was continuously impregnated with the matrix resin solution obtained as described above by using a drum winder type impregnating machine. The carbon fiber tow impregnated with the matrix resin was wound parallel to each other around a drum having, on its surface, a release paper subjected to a silicone treatment and, then, after the solvent contained in the matrix resin solution was evaporated, it was heated for 15 minutes at a temperature of 130° C. Thus, a uni-directional prepreg of the carbon fiber was prepared. The prepreg thus obtained was cut into sheets with a length of 280 mm and a width of 30 mm. Nine sheets of the prepreg thus obtained were laminated and placed in a mold, where the laminate was heated at 130° C for 30 minutes and, then, at 170° C for 1 hour under a pressure of 7 kg/cm² between hot plates of a hydraulic press, and further heated at 170° C for 2 hours in an oven for postcuring.

The content of the carbon fiber in the CFRP thus obtained was 57% by volume and the interlaminar shear strength of CFRP determined according to the method of ASTM D 2344 was 9.10 kg/mm².

EXAMPLE 31

CFRP was prepared in the same manner as in Example 30, except that a matrix resin solution comprising 228 g of Epikote ® 828, 19 g of boron trifluoride monoethyl amine complex and 18 g of ethyl acetate and 400 g of the methyl methacrylate/butyl acrylate/glycidyl methacrylate terpolymer solution prepared in the same manner as in Example 30 (resin content = 152 g) was used.

The content of the carbon fiber in the CFRP so obtained was 55% by volume and the interlaminar shear strength was 9.22 kg/mm².

EXAMPLE 32

CFRP was prepared in the same manner as in Example 30, except that a matrix resin solution comprising 152 g of Epikote ® 828, 19 g of boron trifluoride monoethyl amine complex and 600 g of the methyl methacrylate/butyl acrylate/glycidyl methacrylate terpolymer solution prepared in the same manner as in Example 30 (resin content = 228 g) was used.

The content of the carbon fiber in the CFRP so obtained was 53% by volume and the interlaminar shear strength was 8.60 kg/mm².

EXAMPLE 33

A mixture of 120 g of methyl methacrylate, 60 g of butyl acrylate and 20 g of glycidyl methacrylate was copymerized in the same manner as in Example 30. The conversion of the copolymerization was 95%.

CFRP was prepared in the same manner as in Example 30, except that a matrix resin solution comprising 228 g of Epikote ® 828, 19 g of boron trifluoride monoethyl amine complex, 18 g of ethylacetate and 400 g of the methyl methacrylate/butyl acrylate/glycidyl methacrylate terpolymer solution obtained above (resin content = 152 g) was used.

The content of the carbon fiber in the CFRP thus prepared was 57% by volume and the interlaminar shear strength was 8.56 kg/mm$^2$.

EXAMPLE 34

A mixture of 70 g of styrene, 50 g of butyl acrylate and 80 g of glycidyl methacrylate was copolymerized in the same manner as in Example 30. The conversion of the copolymerization was 93%.

CFRP was prepared in the same manner as in Example 30, except that a matrix resin solution comprising 228 g of Epikote ® 828, 19 g of boron trifluoride monoethyl amine complex, 18 g of ethylacetate and 409 g of the styrene/butyl acrylate/glycidyl methacrylate terpolymer solution obtained above (resin content = 152 g) was used.

The content of the carbon fiber in the CFRP thus prepared was 55% by volume and the interlaminar shear strength was 8.66 kg/mm$^2$.

COMPARATIVE EXAMPLE 6

CFRP was prepared in the same manner as in Example 30, except that a matrix resin solution comprising 450 g of Epikote ® 828 and 22.5 g of boron trifluoride monoethyl amine complex dissolved into 222.5 g of ethyl acetate was used.

The content of the carbon fiber in the CFRP so obtained was 58% by volume and the interlaminar shear strength was 7.06 kg/mm$^2$.

COMPARATIVE EXAMPLE 7

A mixture of 120 g of methyl methacrylate and 80 g of butyl acrylate was copolymerized in the same manner as in Example 30. The conversion of the copolymerization was 95%.

CFRP was prepared in the same manner as in Example 30, except that a matrix resin solution comprising 228 g of Eipkote ® 828, 19 g of boron trifluoride monoethyl amine complex, 22 g of ethylacetate and 396 g of the methyl methacrylate/butyl acrylate bipolymer obtained above (resin content = 152 g) was used.

The content of the carbon fiber in the CFRP thus prepared was 56% by volume and the interlaminar shear strength was 7.01 kg/mm$^2$.

What we claim is:

1. A carbon fiber composition comprising (i) about 90 to 99.9% by weight carbon fiber, (ii) a total of 0.1 to 10% by weight of at least one vinyl addition polymer having at least one oxirane ring, said vinyl addition polymer being prepared by polymerizing one or more ethylenic unsaturated compounds containing at least one oxirane ring or by copolymerizing said one or more ethylenic unsaturated compounds with one or more other polymerizable compounds and (iii) at least one polyfunctional epoxy compound having an epoxy equivalent of 80 through 175 and selected from the group consisting of polyfunctional epoxy compounds having the following formulae and the condensation products thereof in a compounding ratio (by weight) of said vinyl addition polymer to said polyfunctional epoxy compound of 2:98 – 98:2:

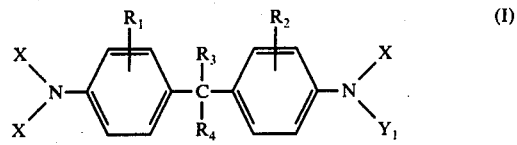

wherein X represents

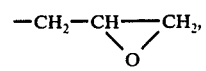

Y$_1$ represents —H or

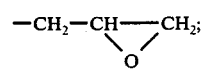

and R$_1$, R$_2$, R$_3$ and R$_4$ represent —H or —CH$_3$, and their condensation products, (b) compounds having the formula (II)

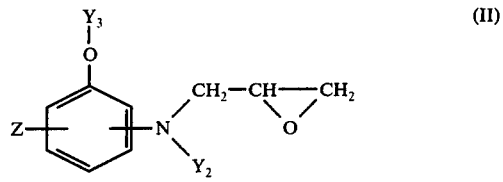

wherein Y$_2$ and Y$_3$ represent —H or

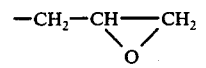

and Z represents —H, —OH,

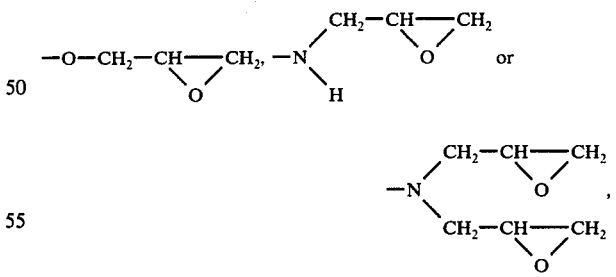

and at least three

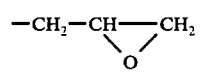

groups are contained in the compound, and their condensation products, (c) compounds having the formula (III)

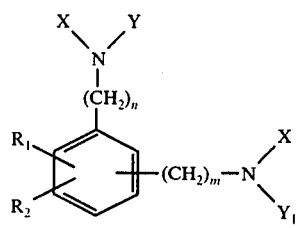

(wherein X, $R_1$, $R_1$ and $R_2$ are the same as defined above, and n and m represent 0 or 1), and their condensation products, (d) cycloaliphatic compounds having the formula (IV)

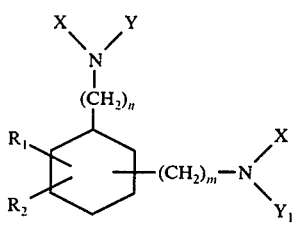

(wherein X, $Y_1$, $R_1$, $R_2$, n and m are the same as defined above and their condensation products, (e) novolak type epoxy resins and their condensation products and (f) polyglycidyl ethers of aliphatic polyols and their condensation products.

2. The carbon fiber composition as claimed in claim 1 wherein at least a portion of said polyfunctional epoxy compound is replaced with polyglycidyl ethers of aliphatic polyols and their condensation products.

3. A carbon fiber composition comprising (i) 15 to 85% by weight, based on the weight of the composition, of carbon fiber, (ii) 85 - 15 wt % of at least one vinyl addition polymer having at least one oxirane ring, said vinyl addition polymer being prepared by polymerizing one or more ethylenic unsaturated compounds containing at least one oxirane ring or by copolymerizing said one or more ethylenic unsaturated compounds with one or more other polymerizable compounds and (iii) at least one polyfunctional epoxy compound having an epoxy equivalent of 80 through 175 and selected from the group consisting of polyfunctional epoxy compounds having the following formulae and the condensation products thereof in a compounding ratio (by weight) of said vinyl addition polymer to said polyfunctional epoxy compound of 2:98 - 98:2:

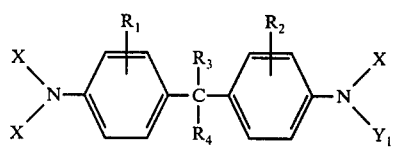

wherein X represents

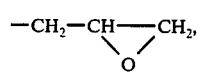

$Y_1$ represents —H or

and $R_1$, $R_2$, $R_3$ and $R_4$ represent —H or —CH$_3$, and their condensation products, (b) compounds having the formula (II)

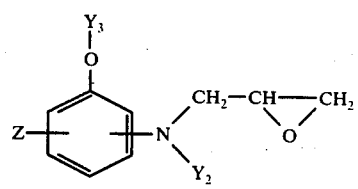

wherein $Y_2$ and $Y_3$ represent —H or

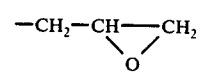

and Z represents —H, —OH,

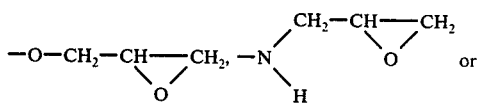

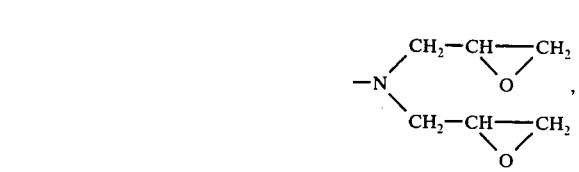

and at least three

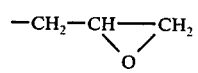

groups are contained in the compound, and their condensation products, (c) compounds having the formula (III)

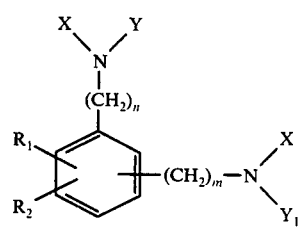

wherein X, $R_1$, $R_1$ and $R_2$ are the same as defined above, and n and m represent 0 or 1, and their condensation products, (d) cycloaliphatic compounds having the formula (IV)

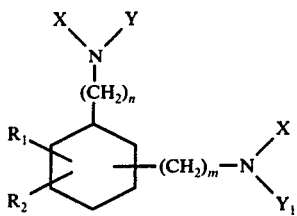

(wherein X, $Y_1$, $R_1$, $R_2$, $n$ and $m$ are the same as defined above) and their condensation products, (e) novolak type epoxy resins and their condensation products and (f) polyglycidyl ethers of aliphatic polyols and their condensation products.

4. The carbon fiber composition as claimed in claim 3 wherein a portion of at least one member selected from the group consisting of said vinyl addition polymer and said polyfunctional epoxy compounds is replaced with not more than 92% by weight based on the total weight of said polymer of at least one resin selected from the group consisting of epoxy resins selected from the group consisting of diglycidyl ether of bisphenol A, diglycidyl ether of bisphenol F, diglycidyl ether of halogenated bisphenol A, diglycidyl ether of aliphatic polyol and cycloaliphatic polyepoxide; unsaturated polyester resins; diallyl phthalate resins, polyamide resins, polyamide imide resins and the prepolymers thereof.

* * * * *